July 29, 1952 W. L. KAEHNI ET AL 2,604,936
METHOD AND APPARATUS FOR CONTROLLING THE
GENERATION AND APPLICATION OF HEAT
Filed Jan. 15, 1946
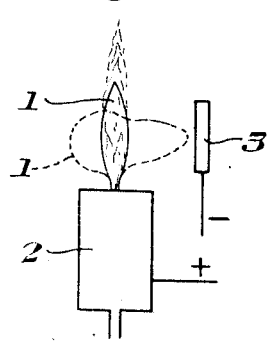
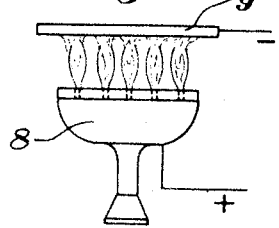
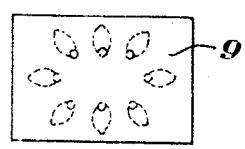
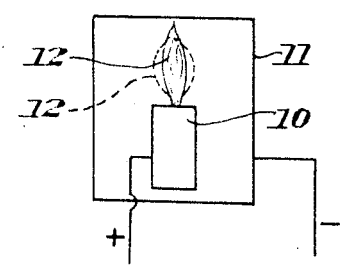
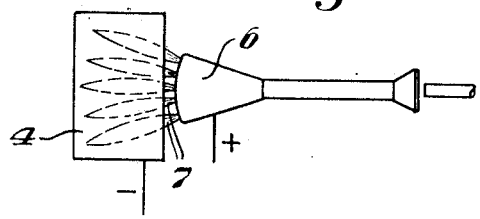
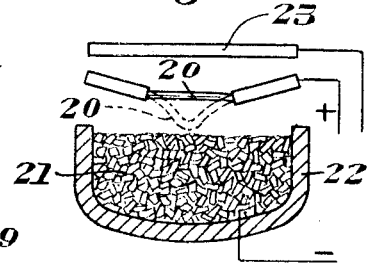
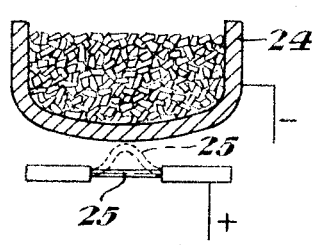
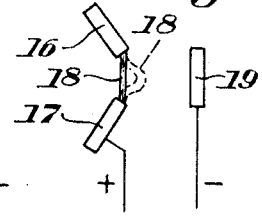
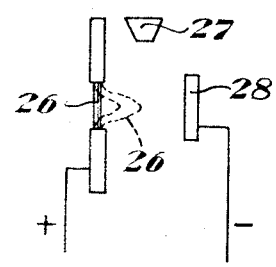
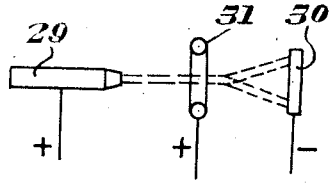
INVENTOR
William L. Kaehni
and Frank J. Kaehni Patented July 29, 1952

2,604,936

UNITED STATES PATENT OFFICE 2,604,936

METHOD AND APPARATUS FOR CONTROLLING THE GENERATION AND APPLICATION OF HEAT

William L. Kaehni and Frank J. Kaehni, Cleveland, Ohio, assignors to Metal Carbides Corporation, Youngstown, Ohio, a corporation of Ohio Application January 15, 1946, Serial No. 641,398

8 Claims. (Cl. 158—113)

The present invention relates generally to the generation and application of heat from whatever source it may be derived and, more particularly, to the use of a unidirectional, high potential electric current for modifying and controlling the generation, flow and application of heat, irrespective of the source of the heat. We have found that our invention can be effectively utilized in the modification and control of the generation and application of heat derived from the combustion of gases, solids or liquids or from an electric arc or from any heat producing medium.

We have found that by the proper application of a unidirectional, high potential electric current for producing a so-called electrostatic field to the heat source or to the heated media, we can accomplish a number of desirable results. We have found that we can (a) materially increase the amount of heat generated by the combustion of combustible gases, solids and liquids; (b) materially improve the character of the combustion, whereby more complete combustion takes place and carbon, soot and other objectionable products of combustion are eliminated; (c) materially increase the amount of heat generated by an electric arc or by other heat radiating media; (d) control and direct the flame produced by the arc or the combustion of combustible materials; (e) control and direct heat generated by the combustion or by the electric arc or other heat radiating media toward a desired point or area of application; and (f) materially increase the efficiency of the heat transfer between a heat source and the point of application. From the ensuing description of our invention, it will be apparent to those skilled in the art that it may be utilized in various ways to accomplish not only the objectives just stated, but many other desirable objectives, dependent upon the particular use made of the principles underlying our invention.

We have discovered that by utilizing a relatively high potential, low energy electric current for creating an electrostatic field and by utilizing the flame or heated media as one of the electrodes and by using an adjacent member or surface as the other electrode, the objectives stated above can be realized. For example, where a flame from a combustible gas or vapor is utilized in a furnace and the positive terminal of a high potential direct current source is made to contact the flame or the burner from which the flame issues and the furnace wall is connected to the negative terminal of the high potential direct current source, several desirable results are obtained. The temperature of the flame, i. e., the amount of heat generated, is increased, the heat generated is caused to flow toward the furnace wall, the character of the combustion is improved and the heat transfer to the furnace wall is materially increased. Due to the directional control over the generated heat, heat losses through the furnace stack are materially reduced and, due to the improvement in the character of the combustion, soot and the like are removed from the escaping products of combustion. This latter phenomenon is particularly observable where the flame, without the electric current being applied thereto, is of a sooty nature because, when the current is applied in the manner just stated, substantially all soot and dirt are eliminated and the flame is transformed into a clear, bright, bluish flame. Due to the directional control over the heat, it being all directed to the sides of the furnace, baffles such as those commonly employed in furnaces of various types can be eliminated.

We have found that the electrical energy required to accomplish the desired results is relatively small. For example, where the invention is applied to the ordinary house heating furnace, about one-half of a milliampere or less is required. The potential as well as the expended electrical energy may be varied within wide limits, depending upon the particular application of our invention. The potentials utilized are in the range of those normally employed for the creation of electrostatic fields. The potential employed may vary from approximately 200 volts up to several hundred thousand volts. It is preferable that the current employed be a uniform direct current, but we have found that, under some circumstances, various types of unidirectional current may be employed. Where a unidirectional current is employed, it may be either continuous, uniform, pulsating or interrupted.

It is preferable in most installations to make the flame or other heated media the positive electrode and an adjacent member or surface (such as the surface where it is desired to apply the heat) the negative electrode in the electrostatic field, although, under some circumstances, suitable but less satisfactory results are obtained where the flame is utilized as the negative electrode of the field.

Throughout this specification reference is made to utilizing the flame or heated media as one of the electrodes for creating the electrostatic field. In using this expression, it is not intended to limit the application of our invention to those apparatus in which the burner or the flame is in direct physical electrical connection with the source of power. On the contrary, this expression is intended to include various ways of applying the current to the flame, for example, by the use of points directed toward the flame or heated media or by a conductor extending into the flame.

In order to clearly explain our invention, we shall describe hereinafter a number of different ways in which it may be utilized. In the drawings, a number of different applications of our invention are illustrated, but it will be understood that it is not intended that these illustrative applications are the only ways in which our invention may be utilized, for it may be otherwise embodied or used within the scope of the claims set forth hereinafter.

In the drawings,

Figure 1 illustrates our invention as applied to an ordinary flame formed by the combustion of a gas or vapor;

Figures 2 and 3 show our invention as applied to a gas flame and are intended to illustrate the directional effect produced on the flame itself;

Figures 4 and 5 also illustrate our invention as applied to an ordinary gas burner and are intended to show the increased intensity of the generated heat;

Figure 6 also illustrates our invention as applied to a gas or vapor burner and is intended to illustrate the effects which can be produced in a furnace;

Figure 7 illustrates our invention as applied to the flame produced by an electric arc;

Figure 8 illustrates our invention as applied to a melting furnace of the electric arc type;

Figure 9 is a diagrammatic view further illustrating the application of our invention to a melting furnace of the electric arc type;

Figure 10 is a diagrammatic view illustrating the application of our invention to the deposition of metals and the like; and Figure 11 is a diagrammatic illustration of the application of our invention to gas welding torches.

In Figure 1, we have shown diagrammatically one embodiment or application of our invention. A flame 1 is provided by an oil lamp or gas burner 2 and is utilized for supplying heat to a wall 3, which may be a wall of a furnace or heat exchanger. The flame, through the burner, is connected to the positive side of a high potential direct current source and the wall 3 is connected to the negative terminal of the current source so that an electrostatic field is created between the flame as the one electrode and the wall 3 as the other electrode. When no current is supplied and no electrostatic field is present, the flame appears as shown in solid lines. It is a wavering, elongated yellow flame from the upper end of which rises a ribbon of soot or smoke showing poor combustion. The wall 3 soon reaches a moderate temperature and remains at that temperature. When the current is turned on and the electrostatic field created, several phenomena occur. The flame shortens and bends toward the wall 3, as indicated roughly in dotted lines. It becomes more intense and the heat generated is materially increased. The soot disappears and the combustion takes place with a clean clear flame. The generated heat is directed toward the wall 3 and it heats up very rapidly to a much higher temperature than that obtained under ordinary operation. Moreover, there is an increase in the rate of heat exchange between the air and the wall. This marked increase in the amount of heat transmitted to the wall may be due to any one or more of the several factors involved, such as the increased intensity of the heat generated, the directional properties imparted to the heated media by the flame, the enhanced heat exchange relationship between the heated media or the flame and the receiving member or wall, and the directing of the flame toward the receiving member.

In the embodiment just described, the positive side of the electrical source is connected to the flame through a direct connection with the burner. This arrangement is preferable although connection with the flame can be made indirectly as by points placed in proximity thereto.

The same results are obtained when a horizontally discharging burner is used, such as that illustrated in Figures 2 and 3. In this illustrative embodiment, two thin sheets of steel 4 and 5 are placed horizontally above and below and approximately equidistantly from a gas burner 6 which discharges a plurality of coplanar horizontal jets or flames 7. The sheets are placed such distance from the burner that the upper sheet 4 is heated to a bright red by the flame 7 supplied by the burner, while the bottom plate remains black. By applying the positive terminal of the source of potential to the burner and flame and the negative terminal to the bottom plate, the flame bends down, as indicated by the dotted lines in Figure 3, toward the lower plate which is heated immediately to bright red. Concurrently the upper plate becomes black. This condition continues so long as the potential differential is applied and reverses immediately upon its cessation. Thus the natural phenomenon of a flame and heated vapors tending to rise is reversed.

If the burner is tilted so that the flame is normally discharged toward the bottom plate, the application of the positive terminal of the source of potential to the burner 6 and the negative terminal to the upper plate 4 causes the flame to change its downward course and bend upwardly to the plate 4.

Figures 4 and 5 illustrate a further embodiment demonstrating the results achieved by our invention. In this embodiment an upright burner 8 of a domestic gas cooking range is arranged beneath a thin steel sheet 9. In normal operation, the flame may be turned up until it billows around the edges of the steel sheet and this condition maintained until a peak temperature for the sheet under such a condition is reached, at which time the sheet is dull red or black. By making the burner 8 and the flame the positive electrode and the sheet 9 the negative electrode, surface areas of the sheet 9 immediately heat to a very bright or whitish red color in a regular pattern corresponding generally to the shape and disposition of the jets of flame but somewhat broader in outline. The flame and gases cease to billow around the edges of the sheet 9 and a greater amount of heat rises from the sheet 9.

We have found that where a thin steel sheet having a diameter about twice that of the burner is placed above the burner these same effects are obtained even at distances as low as from ¼" to 2" where it would be assumed that little of the heat would escape around the edges of the plate. When the electrostatic field is produced in the manner stated, the amount of heat transmitted to the plate increases abruptly. We have also found that where the burner is arranged from ½" to ¾" below a receptacle which contains a measured amount of water and the burner is adjusted for as efficient a flame as possible and the flame is caused to impinge on the bottom of the receptacle, about 5 minutes is required to raise the water to a boiling temperature and boil it away under normal conditions. However, by applying from 3,000 to 4,000 volts potential differential between the burner and receptacle, the burner being positive, the flame shortens, the boiling increases very pronouncedly in intensity, and the same amount of water is heated to a boiling temperature and boiled away in about 3 and ¼ minutes.

Figure 6 diagrammatically illustrates another embodiment of our invention wherein a burner 10 is enclosed in a cylindrical shell or furnace wall 11, the burner and shell being electrically insulated from each other. The burner and flame are connected to the positive terminal of the high voltage source and the wall 11 is connected to the negative terminal so that an electrostatic field can be created therebetween. If the combustion is not good, the burner will normally operate to produce a long wavering yellow sooty flame 12 when the current is not on, such that the soot forms a clearly visible thread or ribbon extending upwardly from the flame and at an appreciable distance above the open top of the furnace 11. However, when the electrostatic field is applied to the flame 12 and the cylindrical shell 11, the flame shortens and spreads toward the shell 6, as indicated by the dotted line 12, and brightens very pronouncedly. The soot disappears and the furnace wall or shell 11 heats up much more rapidly than when no potential is applied.

We have found that with a potential of 7000–8000 volts and with a current flow of less than one quarter of a milliampere, the flame 12, which normally heats the shell 11 to a maximum of 80° F., as evidenced by a dial type thermometer positioned thereagainst, cause the same dial thermometer to swing to its maximum temperature of 220°, then continue on around the dial for a second complete revolution, and then therebeyond on a third revolution until it is mechanically prevented from further movement. It remains in this position as long as this potential difference is maintained. As soon as the applied electrostatic field is removed, the thermometer begins dropping rapidly and soon levels off again at 80° F. Immediately upon discontinuing the application of the field the flame regains its normal yellow cast denoting imperfect combustion and the soot ribbon immediately reappears.

It is well known that two bodies charged with static potentials of opposite polarity are mutually attractive. On this basis it would be predicted that, even if such charges were found to affect flames, heat, and incandescent media, the results above described could be obtained by applying a negative potential to the flame and a positive potential to the furnace of control surface. However, upon reversal of the polarity from that above described so that the flame is negative and the furnace positive, a very unexpected result is produced. Instead of the flame and the generated heat being attracted toward and efficiently applied to the wall of the furnace or shell 11, it tends to spread and be depressed as though subject to a strong down draft. With an upwardly discharging burner, such as illustrated in Figure 6, it observably causes an application of heat on the burner at the base of the flame, the evolution of visible white combustible gases at the base of the flame being pronounced. The temperature of the furnace shell 11 does not increase but decreases.

At the present time a full theoretical explanation of these phenomena discovered by us cannot be given but the results achieved and the manner of achieving them are known and can be put to many uses, such as directing a flame and heated media to a location desired so as to localize them and also to concentrate them on a surface, increasing the efficiency of combustion and reducing the formation of soot, causing better heat exchange relationship between a surface and a flame or heated media, vapors or particles, separating and depositing metals and other materials out of heated and incandescent vapors of the metal or materials, increasing the heat generated and counteracting the effects of gravity on flames and incandescent media.

As a result of these combined effects, the generated heat may be increased and the flames and media can be concentrated, distributed and otherwise controlled in various types of domestic and industrial furnaces so that the size of the furnace can be reduced and losses of heat in flue gases reduced concurrently.

When our invention is applied to a furnace, the negative electrode may be a part of the furnace heat exchanger and will be electrically insulated from the burner and those parts to which the application of heat is not desired. In its application to a water tube furnace, for example, the burner is electrically insulated from the rest of the furnace and a positive potential applied thereto and a negative potential applied to the furnace tubes. The flames, incandescent vapors and gases from the coal, oil or gaseous fuel concentrate on the surfaces of the tubes and the desired results mentioned above are secured. Even the heat beyond the flame is concentrated on the walls or tubes of the furnace and the heat losses in flue gases are materially reduced.

Again, when a charge of metal to be melted in a crucible or open hearth furnace, which is properly insulated by the usual refractories, has impressed on it a negative potential, the positively charged heat and flame supplied concentrate on the charge rather than on the furnace structure. If it is desired to apply the heat to the crucible or furnace, the crucible or furnace may be charged negatively and the flame positively. The furnace with its negative charge can be grounded to prevent electrical shock and only the burner insulated, if desired.

The same novel, desirable results as those obtained where the flame and heated media are provided by combustible solids, gases, vapors, and liquids can be obtained where the flame is an electric arc. Where an electric arc is used either one of the electrodes which form the arc can be connected to the positive terminal of a source of high potential current and the negative terminal can be connected to the member toward which the heat is to be directed. The arc bends out of its normal path toward the member, thus assisting in concentrating the heat on the plate, and the arc also apparently increases in intensity. The heat exchange relationship between the arc and the heated media provided thereby and the member is also enhanced.

In Figure 7, we have illustrated an embodiment of our invention as applied to an electric arc. A pair of electrodes 16 and 17 are provided and the arc 18 is formed therebetween. The plate 19 for receiving the heat is provided adjacent the arc 18 and is insulated from the electrodes. The positive terminal of the potential source is connected to the arc 18 and a negative terminal is connected to the plate 19 with the result that the arc increases in intensity and bends immediately toward the plate, as indicated by the dotted line 18. This particular type of application of our invention is highly desirable in the arc type furnaces wherein the charge of material in the furnace or the crucible has impressed thereon a negative charge, thus corresponding to the plate 19, and the arc has impressed thereon a positive charge. The arc can be directed against the charge or against the crucible, as desired.

In Figure 8, we have illustrated the application of a flame, such as an arc 20, to a charge of metal 21 to be melted in a crucible 22. By connecting the positive side of the source of potential to the arc and the negative side to the charge of metal, the arc can be increased in intensity and applied to the charge, even against the effects of gravity. Since it is desirable to reduce the heating of the roof of the furnace, a plate 23 is placed above the arc 20 and a positive potential is impressed thereon to repel the arc, the charge or furnace crucible being negative.

If it is desired to apply the arc to the crucible, as is illustrated in Figure 9, the negative side of the potential source is applied to the crucible 24 and the positive side is applied to the arc 25, thus increasing the intensity of the arc and drawing the arc against the crucible, as is indicated by the dotted line 25.

Another useful application of our invention, which is illustrated diagrammatically in Figure 10, is in the recovery and deposition of metals and other materials. The metal or metallic compound or other material in comminuted form may be applied to the arc 26 from a hopper 27 or it may be brought into the sphere of the arc in any other desired manner or form. The metal is melted, and in some cases vaporized, and the resulting minute particles, as a result of the electrostatic field, are impelled toward and deposited on a collecting plate 28. The desired electrostatic field is created by connecting the arc to the positive side of the potential source and the plate 28 to the negative side. The metal is deposited in the form of minute globules on the plate 28. The plate 28 may be heated so that the collected metal can liquefy and run off if it is to be collected and used. This operation can be carried out in an oxidizing or a non-oxidizing atmosphere. By the use of this method in a non-oxidizing atmosphere, pure metals can be recovered.

In Figure 11 we have illustrated our invention as applied to gas welding torches. By connecting the torch nozzle 29 and the flame therefrom to the positive terminal of the high potential source and the work-piece 30 to the negative terminal, the flame can be concentrated on the work and the generated heat will be increased. If an annulus 31 is interposed between the work 30 and nozzle 29 and is given a positive charge, the flame is attracted toward the center of the annulus 31 and the incandescent and heated particles become mutually repellent and spread from each other and are attracted in spreading condition to the work. A somewhat different effect can be obtained by grounding the plate or work-piece and the negative terminal of the potential source and by making the flame positive at 10,000 volts, and the annulus positive at 5,000 volts. Under these conditions, the flame is propelled by the annulus toward the plate or work-piece by a 5,000 volt potential. By selecting desired voltages and polarities, the flame can be spread, contracted, or elongated, selectively.

The voltage required for any specific application to provide a high potential electrostatic field accomplishing our objectives will, of course, depend upon the spacing between the electrodes. As the spacing increases, the voltage increases proportionately. For example, a potential of 3000 volts with a spacing of two inches between electrodes, i. e., a potential gradient of 1500 volts per inch, is effective, whereas lower potential gradients are ineffective to provide suitable results.

In practice, we have applied our invention to a domestic furnace of the coal burning type, which had been converted to use gas, and excellent results were obtained. The burner was connected to the positive terminal of the source of high potential and the fire pot of the furnace was connected to the negative terminal so that an electrostatic field was created between the flame and the side wall of the furnace. When burning gas at the rate of about one cubic foot per minute, a 3,000 volt potential at about $\frac{6}{10}$ of a milliampere of current was utilized to create the electrostatic field. There was an increase in the intensity of the heat generated by the burner, soot was eliminated, the heat was directed against the fire pot and there was an increase in the heat exchange between the heated media and the furnace and the flue gases were relatively clean. Due to the directional effect upon the generated heat and the apparent increase in the generated heat, it is possible, where our invention is employed, to obtain a greater amount of heat from a furnace of any given size than is possible where our invention is not employed. Also furnace design can be materially simplified due to the fact that baffles, such as are normally employed to properly direct the heat, are not necessary in view of the directional properties imparted to the heated media by the electrostatic field.

In all of the various applications of our invention described above, best results are obtained by utilizing the flame or heated media or heat source as the positive electrode for the electrostatic field and the adjacent member (furnace wall, collecting plate, metal batch or molten bath or the like) as the negative electrode in the field. In the case of flames produced by the combustion of gases, liquids, vapors and solids, the desirable results mentioned above are not obtained if the flame is made the negative electrode, but in the case of electric arcs, some noticeable desirable results are obtained. However, other desirable results may be obtained by connecting the flame or other heat source to the negative side. For example, where it is desirable to keep the heat away from a furnace wall this may be done by connecting the furnace wall to the positive side of the potential source and the flame or heat source to the negative side of the potential source. The situation existing where, for example, a gas flame is made the negative electrode is at present unexplainable in view of the fact that the action produced seems contrary to ordinary principles of electrostatic attraction where unlike charges attract one another.

It will be apparent to those skilled in this art that our invention has numerous applications. The following are a few of the many possible applications where highly advantageous results can be accomplished:

1. In heating furnaces of various kinds to increase the intensity of the heat produced, eliminate soot and smoke, control the direction of the flow of the heat and improve the heat exchange relationship.

2. In metal melting furnaces fired with a combustible fuel.

3. In metal melting furnaces of the electric arc type.

4. In gas and electric welding apparatus.

5. In the separation of a metal from other metals or elements with which they are compounded.

6. In the collection of melted vapors of metals or chemicals resulting from the roasting or refining of ores.

7. In the separation of metals in powdered or liquid form from ores or solid metals or metal compounds. In this connection, the metals can be vaporized in an electric arc and collected by electrostatic precipitation with the high potential electrostatic field applied between the hot vapor and a collecting surface.

8. In the refining of ores.

9. In controlling the size of metallic or other particles by precipitation. For example, metal carbides can be deposited on steel electrically before sintering and then sintered by heat under electrostatic directional control.

10. In the production of powdered tungsten or other metals by vaporizing the solid metal in an electric arc and then condensing the metal electrostatically on a colder surface.

11. In the cracking of petroleum products electrostatically.

12. In the reclaiming of soot or carbon from burning materials.

13. In the production of chemically pure copper powder from ores or impure copper by heating the material in a controlled hydrogen atmosphere and depositing the metal electrostatically on a negatively charged surface while the burning or vaporizing copper ore is maintained at a high positive potential.

14. In the manufacture of tungsten carbide tools by depositing the material electrostatically on the tool prior to sintering.

15. In the disassociation of various chemical compounds.

The desirable results mentioned hereinbefore as flowing from the utilization of the present invention can be obtained in the various applications mentioned and in various other possible applications.

In the foregoing specification and in the claims, we have used the word "flame" and have spoken of utilizing the flame as one of the electrodes in creating the electrostatic field. The word "flame" is meant to include not only the highly incandescent condition existing at the point of combustion, but also the heated media (vapors, gases and small particles) adjacent thereto.

The subject matter of this application is related to that of applicants' copending application S. N. 760,974, filed July 15, 1947 and having the same assignee as this application.

While we have described herein a number of illustrative embodiments of our invention and have set forth a number of applications to which our invention may be put, it will be understood that our invention is not specifically limited thereto but may be otherwise practiced or embodied within the scope of the appended claims.

We claim:

1. A heating process which comprises the steps of forming a flame and providing and maintaining an electrostatic field having a potential gradient of in excess of about 1500 volts per inch between the flame and an adjacent object to which heat is to be applied using the flame as the positive electrode for creating the electrostatic field.

2. In the heating of an object, the steps comprising forming a flame and establishing and maintaining a unidirectional electrostatic field having a potential gradient of in excess of about 1500 volts per inch between the flame and the object to which heat is to be applied, using the flame as the positive electrode for establishing the electrostatic field.

3. A heating process which comprises the steps of forming a flame and impressing a positive potential on the flame while impressing a negative potential on an adjacent object to which heat is to be applied to thereby establish a unidirectional electrostatic field between the flame and the adjacent object having a potential gradient of in excess of about 1500 volts per inch between the flame and the said object.

4. The method of controlling the flow of heated media which comprises forming a flame, impressing a positive potential on the flame and a negative potential on an adjacent object to which heat is to be applied to thereby establish and maintain a unidirectional low energy electrostatic field between the flame and the said object having a potential gradient in excess of about 1500 volts per inch.

5. In the method of controlling heated media, the steps comprising forming a flame and creating and maintaining a unidirectional electrostatic field having a potential gradient of in excess of about 1500 volts per inch between the flame and an adjacent object to be heated, utilizing the flame as the positive electrode for said field.

6. A melting process comprising the steps of heating the material to be melted by a flame and, at the same time, establishing and maintaining an electrostatic field having a potential gradient of in excess of about 1500 volts per inch between the flame and the material to be melted, using the flame as the positive electrode for said electrostatic field.

7. A heating apparatus comprising a burner, means for supplying a combustible material to said burner, an electrode adjacent the burner, and means for establishing and maintaining a unidirectional electrostatic field between the burner and the electrode having a potential gradient of in excess of about 1500 volts per inch, the burner being the positive electrode for said electrostatic field.

8. In combination, means for forming a flame, an electrode adjacent the flame, and means for forming an electrostatic field having a potential gradient of in excess of about 1500 volts per inch between the flame and said adjacent electrode, the flame forming the positive electrode for said field.

WILLIAM L. KAEHNI.
FRANK J. KAEHNI.

REFERENCES CITED

The following references are of record in the file of this patent:

UNITED STATES PATENTS

| Number | Name | Date |
|---|---|---|
| 867,878 | De Forest | Oct. 8, 1907 |
| 937,759 | Blake | Oct. 26, 1909 |
| 1,399,422 | Chubb | Dec. 6, 1921 |
| 2,057,431 | Hobrock | Oct. 13, 1936 |
| 2,127,977 | Lamb | Aug. 23, 1938 |
| 2,133,654 | Brink | Oct. 18, 1938 |
| 2,181,095 | Ness | Nov. 21, 1939 |
| 2,294,498 | Heindlhofer | Sept. 1, 1942 |
| 2,356,489 | Amstuz | Aug. 22, 1944 |
| 2,364,645 | Mott et al. | Dec. 12, 1944 |
| 2,411,737 | Klinke | Nov. 26, 1946 |
| 2,511,177 | Richardson | June 13, 1950 |

OTHER REFERENCES

"A Text Book on Static Electricity," by Hobart Mason, pub. by McGraw Publishing Co., New York, 1904, page 24, Fig. 9.